Aug. 24, 1943.    J. W. WALLIS    2,327,572
PIPE COUPLING
Filed April 30, 1941    2 Sheets-Sheet 1

JOHN W. WALLIS,
INVENTOR

BY Lyon & Lyon
ATTORNEYS.

Aug. 24, 1943.    J. W. WALLIS    2,327,572
PIPE COUPLING
Filed April 30, 1941    2 Sheets-Sheet 2

JOHN W. WALLIS,
INVENTOR
BY Lyon & Lyon
ATTORNEYS

Patented Aug. 24, 1943

2,327,572

UNITED STATES PATENT OFFICE 2,327,572

PIPE COUPLING

John W. Wallis, Los Angeles, Calif.

Application April 30, 1941, Serial No. 391,032

10 Claims. (Cl. 285—193)

This invention relates to pipe couplings of the quick, detachable type, and particularly those employing rubber gaskets which permit a certain amount of angular movement without leakage. Couplings of this general type are old in the art, as disclosed in my Patents 2,067,428, issued January 12, 1937, and 2,132,769 issued October 11, 1938, respectively. The present invention is a further development of the couplings disclosed in my previous patents.

Couplings of the general type to which this invention relates, involve a pair of pipes to be coupled, one of which has an enlarged female end containing a flexible rubber gasket adapted to receive and seal about the male end on the other pipe. The particular construction of the pipe ends and the gasket for effecting a seal in angular as well as straight positions of the pipes, is substantially the same as in the prior patents, referred to. The present invention differs from the prior known structures in the hitching elements employed to hold the two pipes against separating movement.

In my prior Patent No. 2,067,428, I have disclosed that the two pipes may be releasably held against separating movement by a female hitch element in the structural form of a circumferentially extending bar or lug on the male coupling member, which is engageable with a male hitch member on the female coupling member by simply inserting the male coupling member into the female coupling member with the circumferential bar out of alignment with the male hitch member, and then rotating the pipe to carry the bar into engagement with the male hitch member, the lug having a stop member at one end for preventing movement of the male hitch member past the end of the lug and for facilitating the coupling of the pipes by the sense of touch. This construction has the disadvantage that it does not lock the two pipes against relative rotation. It is a desirable limit relative rotation between the two pipe sections for the reason that the pipes are often equipped with risers or sprinkler heads which should be maintained in vertical position, and if the couplings between the pipe sections permit even a small amount of avoidable relative rotation, the effect becomes cumulative in a long line and may permit a very objectionable rotary displacement of the section of the pipe containing a riser or sprinkler head.

In my second Patent No. 2,132,769, I further disclosed a construction in which the contacting surfaces of the hitch elements were disposed substantially in the transverse plane containing the axis about which the pipes swing during relative angular movement. The structure of the second patent has the advantage over that disclosed in the first patent in that the two pipe members are locked against relative rotation about their longitudinal axis. However, it is sometimes desirable to have a quickly connectible hitch which limits relative rotation between the coupled pipes, without employing a construction in which the contacting elements of the hitch lie in the transverse plane containing the center about which the pipes pivot for angular or bending movement.

An object of the present invention is to provide a hitch structure for interconnecting flexible joint pipes that is particularly simple, rugged and durable.

Another object of the present invention is to provide a hitch structure for interconnecting flexible-joint pipes without resorting to a construction in which the contacting elements of the hitch are positioned in the transverse plane containing the axis of bending movement while at the same time limiting the possible relative rotary movement between the coupled pipes to a small angle.

Another object of the invention is to provide a coupling structure that is easily and quickly coupled and uncoupled under all conditions of visibility, the structure being of such a nature as to permit the coupling and uncoupling operations to be performed by the sense of touch while supporting the pipe at a distance from the coupling.

Other more specific objects and features of the invention will become apparent from the detailed description to follow, which refers to the drawings.

Briefly, the hitch structure of the present invention resembles the hitch disclosed in my first Patent 2,067,428 and differs from the structure of my second Patent 2,132,769 in that the hitch elements contact in a plane longitudinally spaced from the transverse plane containing the axis about which the pipes swing during bending movement. The present structure differs from the structure of my first Patent 2,067,428 in that it involves hitch elements differently shaped and positioned to achieve the objects of the invention.

Figure 1:
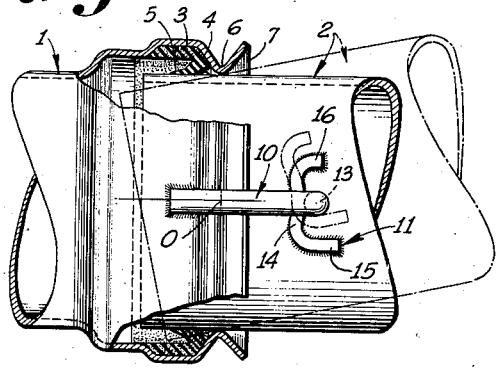
Fig. 1 is a side elevation, with portions in section, of one embodiment of my invention.
Figure 1A:
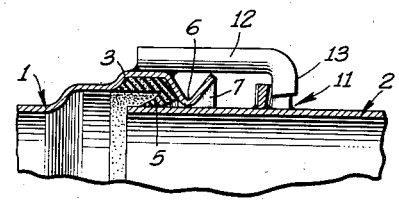
Fig. 1A is a detail longitudinal section, taken in a plane perpendicular to the section plane of Fig. 1.

Referring first to Figs. 1 and 1A, there is shown a pipe 1 having an enlarged female end portion adapted to telescopically receive the male end of a pipe 2. The enlarged female end portion of pipe 1 is shaped to define an annular trough or channel 3 for containing an annular rubber gasket 4 having a flexible lip 5 adapted to bear against and seal with the outer surface of the pipe 2 in all angular positions of the latter with respect to the pipe 1. Immediately in front of the channel 3 the pipe 1 is constricted to define an annular shoulder 6 which is only slightly larger than the external diameter of the pipe 2 and serves to support the pipe 2 with respect to the pipe 1 against lateral movement. Beyond the constricted portion, the pipe is flared outwardly to define a funnel-shaped guiding lip 7 which facilitates entering the pipe 2 into the pipe 1 and protects the shoulder 6 to a certain extent.

To support the pipes 1 and 2 against longitudinal, separating movement while permitting limited bending movement, I provide a male hitch member 10 on the female pipe 1 and a cooperating female hitch member 11 on the male pipe 2. As best shown in Fig. 1A, the male hitch member 10 comprises a bar having a longitudinal, straight portion 12 contacting the pipe 1 at the channel portion 3 and the edge of the lip portion 7, and welded at the points of contact. The straight section 12 projects longitudinally beyond the lip 7 and has its end turned down to form a pin 13 which extends substantially radially with respect to the axis of pipe 1.

The female hitch member 11 on the pipe 2 consists of a strip of metal bent to form an arcuate bar section 14 extending approximately circumferentially about the pipe and merging at one end into a long longitudinal arm 15 and merging at the other end into a short longitudinal arm 16.

The female hitch member 11 has its inner surface shaped to conform to the curvature of the pipe 2 and is welded thereto.

The coupling of Figs. 1 and 1A is manipulated as follows: To disconnect the coupling, the pipe 2 is moved into the pipe 1 until the female hitch member 11 abuts against the lip 7, whereupon pipe 2 is rotated counterclockwise to carry the short leg 16 of female hitch member 11 past the pin 13, permitting withdrawal of the pipe 2 from pipe 1. To couple the pipes, pipe 2 is inserted into pipe 1, insertion being facilitated by the guiding lip 7, until the female hitch member 11 abuts against the lip 7, the female hitch member 11 being out of alignment with the male hitch member 10. Pipe 2 is then rotated clockwise until the arm 16 passes the pin 13 and the latter abuts against the long arm 15 of female hitch member 11, thereby indicating to the operator by the sense of touch that the hitch members are engaged, whereupon the pipe 2 is withdrawn from pipe 1 until the pin 13 engages the portion 14 of the female hitch member 11.

In the absence of other restricting conditions, the extent to which a coupling of the type shown in Fig. 1 can be bent, depends upon the diameter of the orifice at shoulder 6 relative to the external diameter of the pipe 2 and the diameter of the orifice may be conveniently one sixty-fourth times the diameter of pipe 2, which permits the coupling to be bent to an angle of approximately 10° without undue binding of the pipe 2 in the orifice 6.

The angular motion between the pipes 1 and 2 takes place about a focal point which is substantially at the intersection of the axis of the pipe 1 with the plane of the shoulder 6. It follows, therefore, that when the contacting portions of the hitch members 10 and 11 are longitudinally displaced from the plane of the shoulder 6, as shown in Fig. 1, bending movement involves relative movement between the hitch members 10 and 11. If the coupling is bent in the longitudinal plane of the male hitch element, then the relative movement between the hitch members 10 and 11 is in a radial plane and the male hitch member 10 moves directly toward or away from the pipe 2. To permit such movement, the inner end of the male hitch member 10 is spaced from the surface of pipe 2 when the coupling is straight, as shown in Fig. 1A.

When the coupling is bent in a plane at right angles to the longitudinal plane through the male hitch element (as shown in dotted lines in Fig. 1), the bending involves relative movement of the male hitch element along the portion 14 of the female member 11 through a definite distance, depending upon the angle through which the coupling is bent and the distance of the contacting portion of the hitch members from the plane through the shoulder 6. In accordance with the present invention, I make the portion 14 of the female hitch element of such length as to just accommodate the relative movement of the female hitch member 11 relative to the male hitch member 10 when the coupling is bent to the maximum angle permitted by the diameter of the shoulder 6 relative to the external diameter of the pipe 2. It is undesirable to make the portion 14 of female hitch member 11 any longer than necessary to permit the desired maximum bending angle, because the permissible rotary movement between the coupled pipes 1 and 2 is determined by the distance between the arms 15 and 16 of the female hitch member 11, and it is desirable to keep permissible relative rotary movement of the two pipes as low as possible.

It will be apparent that since the bending movement of the coupling takes place about a transverse axis substantially at the intersection of the longitudinal axis of pipe 1 with the plane of the shoulder 6 (the axis being indicated at 0 in Fig. 1), the relative movement between the female hitch member 11 and the male hitch member 10 is arcuate instead of linear. Thus when the pipe 2 is bent, as shown in broken lines in Fig. 1, the female hitch member 11 swings in an arcuate path about the center 0. I therefore form the portion 14 of female hitch member 11 on an arc of radius equal to the distance of the contacting surface of pin 13 from the axis 0, so that in all positions of swinging movement of the pipe 2 about the axis 0, the male hitch member maintains contact with the portion 14 of female hitch member 11. This is highly desirable in practice, because it prevents binding between the high members during bending about the axis 0, and facilitates the bending operation.

It will be apparent from inspection of Fig. 1 that the female hitch member, in moving from the full line to the dotted line position, travels a distance very nearly equal to the radius from axis 0 to the contacting surface of the hitch member, multiplied by the tangent of the bending angle, and the total distance between the stop portions 15 and 16 of the female hitch member will be twice as great. More accurately stated, the stops 15 and 16 should be spaced a distance equal to the radius from the center 0 to the contact surface of the hitch members multiplied by the total angle of bending, expressed in radians, from one extreme position to the other, plus the diameter of the male hitch element of the male hitch member 10.

Couplings of the type described are used extensively in irrigation pipe lines, in which the pipe lines ordinarily extend straight across a field but follow the contour of the ground, so that there is little or no horizontal angular bending of the couplings, but whatever vertical bending may be required to accommodate the pipe to the contour of the land and to permit the pipes to be coupled from a substantially standing position at center of a pipe section. When the coupling of Fig. 1 is employed in such a system it is desirable that the hitch members be positioned on the side of the pipe, as shown in the elevation view of Fig. 1. In other words, it is desirable to so orient the pipe that the hitches are on the side of the bend, instead of within or exterior of the bend.

Figure 2:
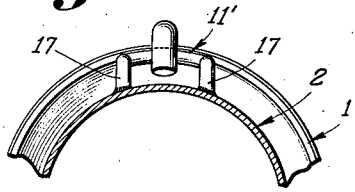
Fig. 2 is a detail cross section through the male coupling showing, in end elevation, a modification of the female hitch element of the structure shown in Figs. 1 and 1A.

Fig. 2 discloses an adaptation of the female hitch structure shown in Figs. 1 and 1A, in which the female hitch member 11' is of skeleton form, instead of being a solid wall rising from the surface of the pipe 2. Thus in Fig. 2, the skeletonized female hitch member 11' is formed of a rod bent to shape and welded only at its ends 17 to the pipe 2. The female hitch member 11', when viewed in plan, appears exactly the same as the female element 11.

Figure 3:
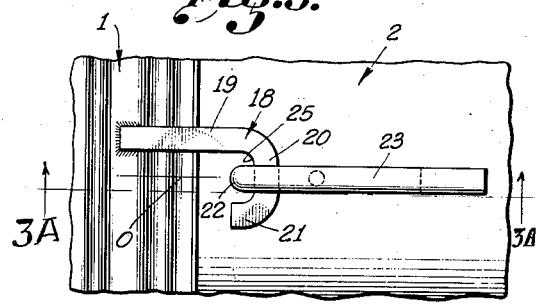
Fig. 3 is a side elevation of an alternative hitch structure for use in a coupling of the type shown in Fig. 1.
Figure 3A:
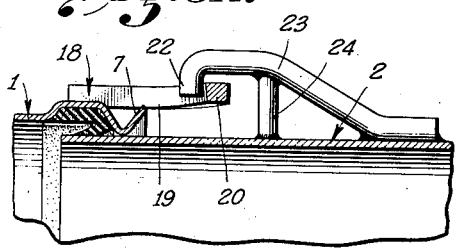
Fig. 3A is a detail section taken in the plane 3A—3A of Fig. 3.

There is disclosed in Figs. 3 and 3A what is in effect a reversal of the hitch structure shown in Figs. 1 and 1A, the female hitch member in Figs. 3 and 3A being formed on the female pipe 1 and the male hitch member being formed on the male pipe 2. With this construction the female hitch member 18 is of approximately L-shape, having a leg 19 welded to the female pipe 1 and projecting a substantial distance therebeyond, the outer end of the cross portion 20 of the L being turned up to form a short arm 21 corresponding in function to the short arm 16 in Fig. 1. The projecting portion of the female hitch member 18 lies exterior of the cylindrical plane of the outer edge of the lip 7 of the pipe 1, so as not to interfere with the entry of the pipe 2 into the pipe 1.

The male hitch member 22, which cooperates with the female hitch member 20, consists of the down-turned end of a rod 23 which is welded to the pipe 2 at its opposite end and extends outwardly and longitudinally from the point of welding. The rod 23 may be reinforced by a pin 24 extending radially and welded to the rod 23 at one end and to the pipe 2 at the other end.

In order to permit free bending movement about the axis 0 of the pipe members 1 and 2 of the hitch construction shown in Figs. 3 and 3A, the inner surface 25 of the portion 20 of female hitch member 18 is arcuately curved about 0 as a center. Whereas, with the hitch construction of Figs. 1 and 1A, it is necessary to have the pin-contacting surface of the female hitch member convex, with the construction of Figs. 3 and 3A it is necessary to have this surface concave.

The construction of Figs. 3 and 3A permits exactly the same bending movement about the axis 0 as does the construction of Figs. 1 and 1A, if the length of the arcuate surface 25 is appropriately chosen.

Figure 4:
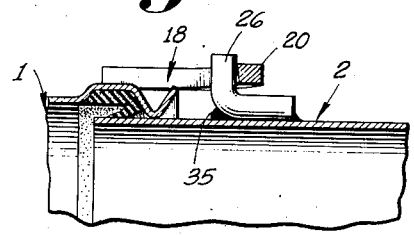
Fig. 4 is a detail section, similar to Fig. 3A, showing a modification of the male hitch element of the structure.

There is shown in Fig. 4 a hitch construction involving the same female hitch member as shown in Figs. 3 and 3A, but a simpler male hitch member. Thus in Fig. 4 the male hitch member 26 is constituted by the legs of an L-shaped rod, one leg of which extends longitudinally against and is welded to the pipe 2. The male hitch member of Fig. 4 has the advantage of being very short and strong and it can be very effectively reinforced by welding at the bend, as indicated at 35. It is also desirable in that it functions as a stop to contact the lip 7 and limit entry of the pipe 2 into the pipe 1.

Figure 5:
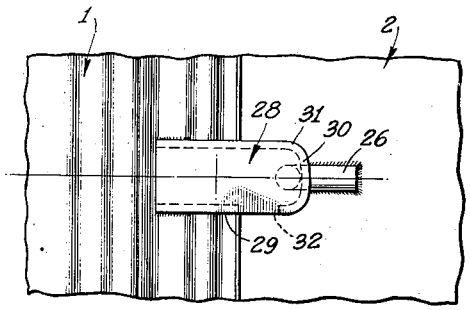
Fig. 5 is a detail, side elevation of still another hitch structure that may be employed in a coupling of the type shown in Fig. 1.
Figure 5A:
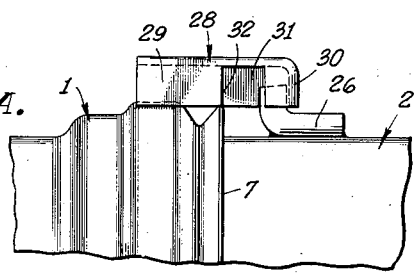
Fig. 5A is a view of the hitch structure shown in Fig. 5, looking at the underside of the hitch.

There is shown in Figs. 5 and 5A a hitch utilizing the male hitch member of Fig. 4 on the male pipe 2 but employing a functionally identical but structurally different female hitch member on the female pipe 1. Thus the female hitch member consists of a substantially flat plate 28 having downturned flanges 29, 30 and 31 on three sides, with the lower edges of the flanges welded to the pipe 1 at their points of contact therewith. The flange 29 has a notch 32 therein positioned immediately in front of the lip 7 on pipe 1 to permit entry of the male hitch member 26.

Comparing the female hitch member construction of Figs. 5 and 5A with that of Figs. 3 and 3A, it will be observed that flanges 31 and 30 and the small portion of the flange 29 beyond the notch 32 of Fig. 5A correspond respectively to the portions 19, 20 and 21 of the female hitch member in Fig. 3. The female hitch member construction of Figs. 5 and 5A is desirable in that it can be of relatively light construction because of the reinforcement afforded by the plate or web 28.

Figure 6:
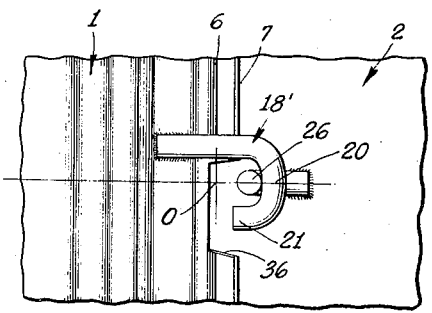
Fig. 6 is a detail elevation showing still another variation of the hitch structure that may be employed in a coupling of the type shown in of Fig. 1.

In Fig. 6 I have shown a variation of the construction of Fig. 4 in which the female hitch member 18' has been shortened so that it does not project so far from the lip 7 on pipe 1, and in which a notch 36 has been cut in the lip 7 to permit passage of the male hitch member 26 past the short arm 21 of the female hitch member when coupling or uncoupling the pipes. This construction is advantageous not only because the female hitch member 18' is more rigid by virtue of being short, but also because it brings the point of contact between the male hitch member 26 and the female hitch member 18' closer to the plane of the orifice 6. This permits making the leg 20 of the female hitch member shorter because it brings it closer to the axis 0 of pivotal movement.

Figure 7:
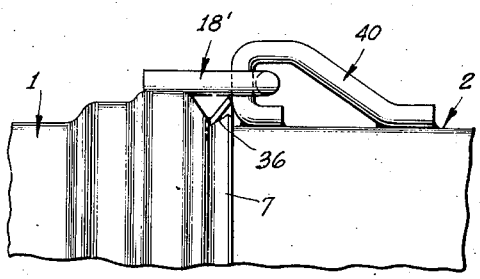
Fig. 7 is a view looking at the underside of a modification of the hitch structure of Fig. 6.

Fig. 7 discloses a female hitch member construction and female pipe construction identical with that of Fig. 6, but employing a male hitch member construction different from any hitherto shown. In effect, the male hitch member of Fig. 6 is a combination of the male hitch member structures of Figs. 3A and 4. Thus it consists of a rod 40 welded at both ends to the pipe 2 and forming a closed loop, which is inherently strong.

All of the modifications of the invention that have been described, function in the same general way and are manipulated in the same way. They differ in details, and different ones of the modifications have different advantages that may be of different importance under different conditions of use. All of them have the great advantage that they can be manipulated almost entirely by the sense of touch, so that pipes can be readily coupled or uncoupled under conditions of poor visibility, and from a substantially standing position at the center of a 30' pipe section. The coupling procedure with all the hitches is to: (1), insert the pipe 1 in the pipe 2 as far as it will go; (2), rotate it clockwise as far as it will go; and (3), retract it as far as it will go. The procedure in uncoupling is to: (1), advance the pipe 1 into the pipe 2 as far as it will go; (2), rotate the pipe counterclockwise to a substantial angle in the case of the structure shown in Figs. 1 and 5, and as far as it will go in the structure of Figs. 6 and 7; and (3), withdraw the pipe 2 from pipe 1.

Although for the purpose of fully explaining the invention several modified structures have been described in detail, all these structures have certain features in common, and an infinite number of other variations than those shown can be employed that still have features common to the modifications disclosed. The invention is, therefore, to be limited only to the extent set forth in the appended claims.

I claim:

1. A flexible pipe coupling comprising a female member having an annular, inwardly projecting shoulder constituting a guiding orifice, a male member adapted to enter said orifice and having swinging movement in an axial plane of said female member, flexible sealing means for effecting a seal between said members in a plurality of angular positions thereof, and hitch means for mutually supporting said members against separating movement, said hitch means comprising a male hitch element on one member and a cooperating female hitch element on the other member, in which the contacting surfaces of said elements are longitudinally displaced from said orifice, the female hitch element comprising a portion extending approximately tangentially with respect to its associated member and longitudinally extending stop portions at the opposite ends of said tangential portion for limiting relative movement of the male hitch element along said tangential portion of the female hitch element, the length of said tangential portion between said stop portions being approximately equal to the product of the longitudinal distance of the said contacting surfaces from said orifice and the bending angle between extreme opposite positions, expressed in radians, plus the thickness of the male hitch element.

2. A flexible pipe coupling comprising a female member having an annular, inwardly projecting shoulder constituting a guiding orifice, a male member adapted to enter said orifice and have swinging movement in an axial plane of said female member, flexible sealing means for effecting a seal between said members in a plurality of angular positions thereof, and hitch means for mutually supporting said members against separating movement, said hitch means comprising a male hitch element on one member and a cooperating female hitch element on the other member, said female hitch element having a hitching portion lying in a plane approximately tangential to its associated member, and said hitching portion of said female hitch element having a hitching surface lying in an arc, the axis of curvature of which lies substantially in the intersection of the plane of said orifice with an axial plane through the middle of said arc.

3. A flexible pipe coupling comprising a female member having an annular, inwardly projecting shoulder constituting a guiding orifice, a male member adapted to enter said orifice and have swinging movement in an axial plane of said female member, flexible sealing means for effecting a seal between said members in a plurality of angular positions thereof, and hitch means for mutually supporting said members against separating movement, said hitch means comprising a female hitch element on said female member, said female hitch element being of approximate L-shape with one leg of the L secured to and extending beyond the end of said female member and the other leg of the L extending substantially circumferentially about said male member but in spaced relation thereto, a male hitch element on said male member adapted to contact said other leg of said L-shaped element for preventing separating movement of said members, and means supporting said male hitch element on said male member.

4. A coupling as described in claim 3, in which said male hitch element is constituted by one leg of an L-shaped member having its other leg lying against and secured to said male member, the said one leg constituting said male hitch element extending substantially radially from said male member of the coupling.

5. A coupling as described in claim 3, in which said male hitch element extends substantially radially from said male coupling member and is secured at its inner end to said male coupling member.

6. A coupling as described in claim 3, in which the said male hitch element extends substantially radially from said male coupling member substantially past the said female hitch element thence longitudinally away from said orifice and returns to said coupling member forming a loop, both ends of said loop being secured to said male coupling member.

7. A flexible pipe coupling comprising a female member having an annular, inwardly projecting shoulder constituting a guiding orifice, a male member adapted to enter said orifice and have a swinging movement in an axial plane of said female member, a flexible sealing means for effecting a seal between said members in a plurality of angular positions thereof, and hitch means for mutually supporting said members against separating movement, said hitch means comprising a female hitch element on said female member consisting of a plate member of approximately rectangular shape spaced from the exterior surface of said female member and substantially perpendicular to a radius from the axis of said female member to said plate, the end portion of said plate projecting beyond the end of said female member, a side wall extending inwardly from one edge of said plate and secured to said female member, an end wall extending inwardly from the said overhanging end of said plate, and a notched side wall extending inwardly from said plate at the edge opposite to said first-mentioned edge, a male hitch element on said male member cooperating with said female hitch element, said male hitch element being adapted to move through said notch into position underlying the overhanging portion of said plate in response to predetermined relative rotation between said two members, and engageable with said end wall to prevent separating movement of said members.

8. A flexible pipe coupling comprising a female member having an annular, inwardly projecting shoulder constituting a guiding orifice, a male member adapted to enter said orifice and have swinging movement in an axial plate of said female member, flexible sealing means for effecting a seal between said members in a plurality of angular positions thereof, and hitch means for mutually supporting said members against separating movement, said hitch means comprising a female hitch element secured to the female coupling member and overhanging the male coupling member and extending substantially circumferentially thereto, a male hitch element on said male coupling member extending substantially radially therefrom and adapted to engage the female hitch element, said female member having an outwardly flared lip extending from said guiding orifice and said lip having a notch therein adjacent said female hitch element to permit longitudinal movement of said male hitch element into and out of engagement with said female hitch element.

9. A flexible pipe coupling comprising a female member having an annular, inwardly projecting shoulder constituting a guiding orifice, a male member adapted to enter said orifice and have swinging movement in an axial plane of said female member, flexible sealing means for effecting a seal between said members in a plurality of angular positions thereof, and hitch means for mutually supporting said members against separating movement, said hitch means comprising an L-shaped female hitch member on said female member, the long leg of the L extending longitudinally along and being secured to the female member and the short leg, overhanging the male member and extending substantially circumferentially thereto, a male hitch element on said male member extending substantially radially therefrom and adapted to engage the short leg of said L-shaped female hitch member, said female member having an outwardly flared lip extending from said guiding orifice and said lip having a notch therein adjacent said female hitch member to permit longitudinal movement of said male hitch element into and out of engagement with said female hitch member.

10. A coupling as described in claim 8, in which said male hitch element extends substantially radially from said male coupling member, past the said female hitch element, thence longitudinally away from said orifice, and returns to said male coupling member forming a loop, both ends of said loop being secured to said male coupling member.

JOHN W. WALLIS.